Oct. 27, 1959     R. L. CARLSTEDT     2,909,947
COOLANT PUMP AND SPINDLE MOTOR CONTROLS
Filed Aug. 12, 1957     4 Sheets-Sheet 1
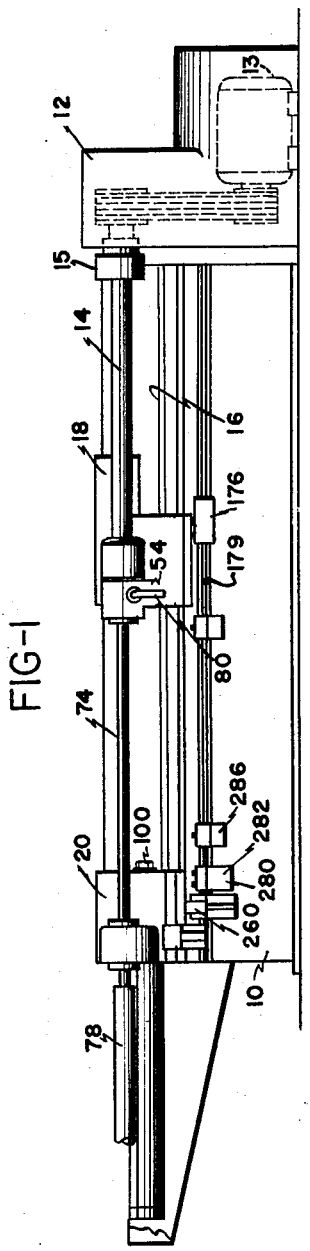
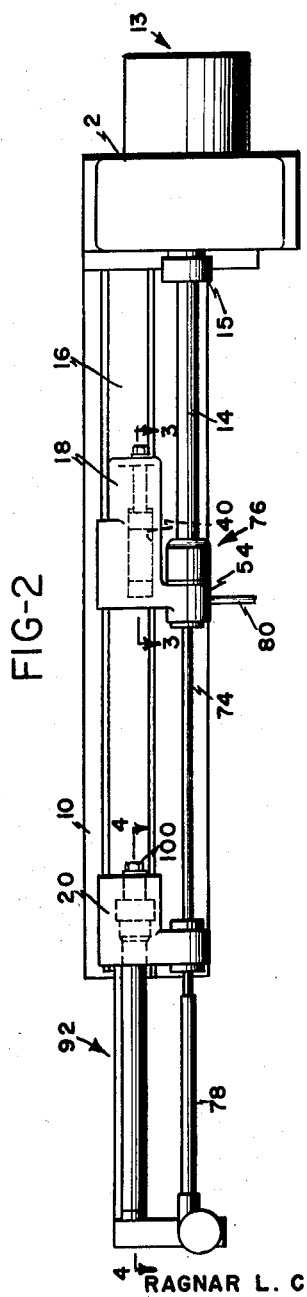
INVENTOR
RAGNAR L. CARLSTEDT
BY *Toulmin & Toulmin*
ATTORNEYS

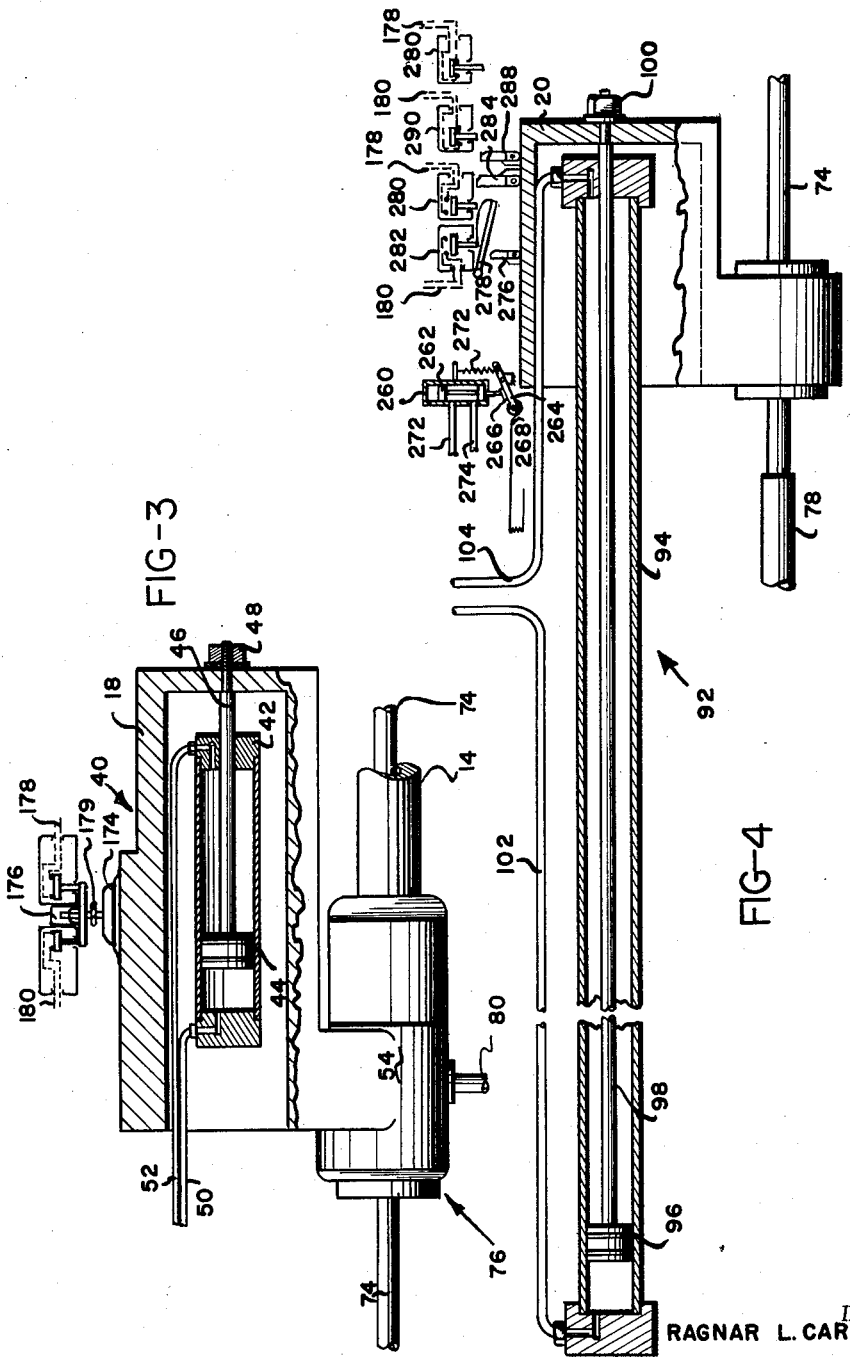

Oct. 27, 1959  R. L. CARLSTEDT  2,909,947
COOLANT PUMP AND SPINDLE MOTOR CONTROLS
Filed Aug. 12, 1957  4 Sheets-Sheet 3
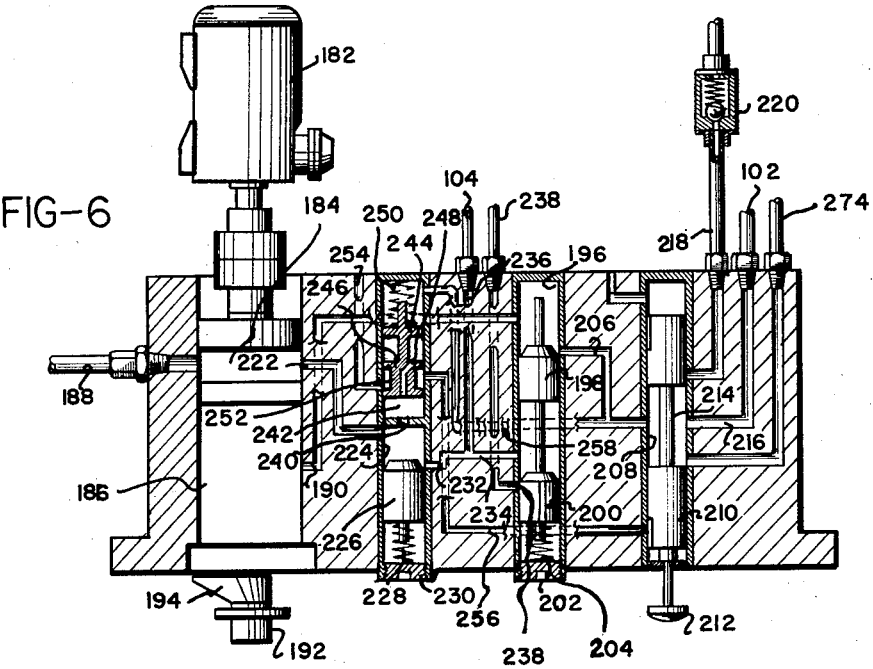
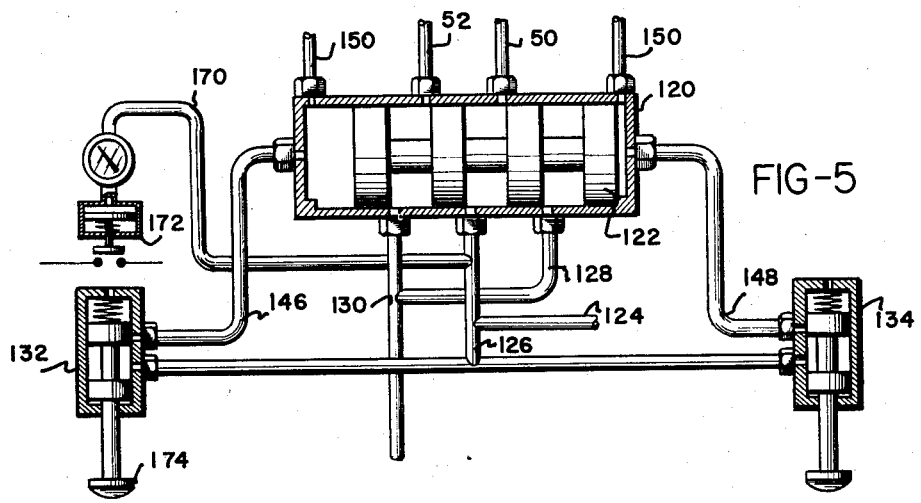
INVENTOR
RAGNAR L. CARLSTEDT
BY *Toulmin & Toulmin*
ATTORNEYS

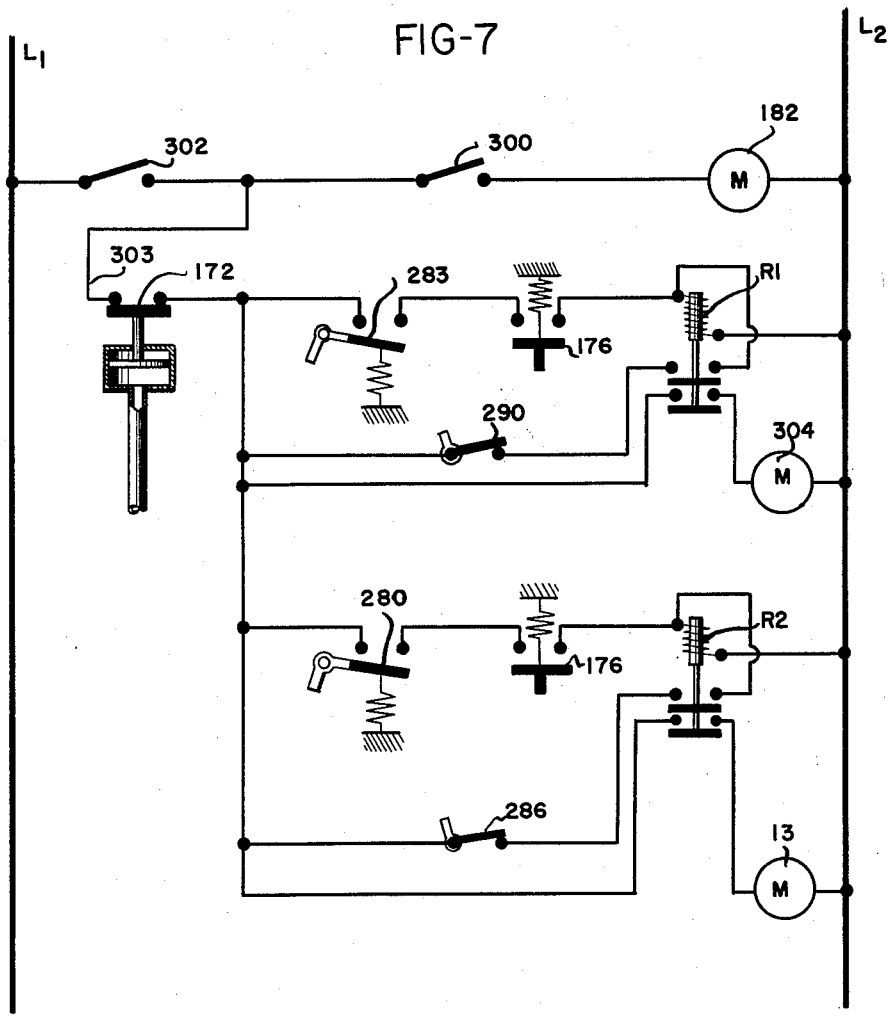

United States Patent Office 2,909,947
Patented Oct. 27, 1959

1

2,909,947

COOLANT PUMP AND SPINDLE MOTOR CONTROLS

Ragnar L. Carlstedt, Cincinnati, Ohio, assignor to DHB Corp., New York, N.Y., a corporation of New York Application August 12, 1957, Serial No. 677,513

3 Claims. (Cl. 77—3)

This invention relates to boring machines, particularly deep hole boring machines and most especially to controls for use in connection with boring machines of this nature to interlock the operation of the various portions thereof. This application is a continuation-in-part of my co-pending application Serial No. 410,548 filed February 16, 1954, which issued as Patent No. 2,878,693, dated March 24, 1959.

In boring machines of the nature with which the present invention is concerned, there is provided a frame and mounted on the frame is a rotary spindle for engaging one end of a workpiece. A workpiece clamp engages the opposite end of the workpiece and holds it on the work axis of the machine.

A boring slide supports an elongated boring tool that is adapted to be moved against the end of the rotating workpiece whereby a bore is formed within the workpiece.

Coolant such as a cutting oil is supplied to the portion of the workpiece being cut along the outside of the boring tool and is conducted away from the cutting area through the boring tool which is hollow for this purpose.

In such machines, in order to obtain a high cutting rate, the workpiece is rotated rapidly and the boring tool is advanced under relatively high pressure and the coolant that is supplied is supplied under extremely high pressures. Inasmuch as the machine is cycled rapidly and high speeds and high pressures are involved it becomes important to interlock the various operations of the machine so that a minimum of attention on the part of the operator of the machine is required to carry out a work cycle in a proper manner.

Having the foregoing in mind, it is a particular object of this invention to provide interlocks in connection with a boring machine of the nature described which will insure the proper operation of the machine throughout the work cycle.

A particular object of this invention is the provision of an interlock in a boring machine of the nature referred to which will prevent operation of the machine if a workpiece of an improper size is placed within the machine.

A still further object of this invention is the provision of a control arrangement in a boring machine of the nature referred to which prevents operation of the cooling fluid supply system except when the workpiece is clamped in the machine thus avoiding the possibility of spraying the high pressure cooling fluid from the machine.

A still further object of this invention is the provision of a cooling system for a boring machine of the nature referred to in which the machine operator is required only to clamp the work in the machine and then initiate operation of the boring slide and an entire operative cycle will be carried out automatically and with the boring tool automatically retracting if overloaded for any reason such as the cutting tool becoming dulled.

These and other objects and advantages will become more apparent upon reference to the drawings in which:

2

Figure 1 is a side elevation of a boring machine according to the present invention;

Figure 2 is a plan view thereof;

Figure 3 is a sectional view through the workpiece clamping unit and is indicated by line 3—3 on Figure 2;

Figure 4 is a sectional view through the boring slide portion of the machine and is indicated by line 4—4 on Figure 2;

Figure 5 is a fragmentary view showing the fluid system pertaining to the clamp motor of Figure 3;

Figure 6 is a view similar to Figure 5 but showing the fluid circuit pertaining to the boring slide motor of Figure 4; and Figure 7 is a digrammatic representation of an electric control circuit for the several motors making up the power units pertaining to the machine.

Referring to the drawings somewhat more in detail the machine shown therein has a frame 10 having a compartment or housing 12 at one end having associated therewith a drive motor or main motor 13 adapted for driving an elongated workpiece 14 via spindle 15 through a belt drive or the like located within compartment 12. The spindle 15 is so arranged, as by means of a conical recess therein with a serrated wall, that the workpiece usually a cylindrical bar, is brought into driving engagement therewith merely by applying pressure to the opposite end of the workpiece.

For so applying pressure to the workpiece the frame 10 has mounted on the longitudinally extending bed portion 16 thereof, a clamping slide 18. On the opposite side of the clamping slide 18 from spindle 15 and also slidable along the bed is a boring slide 20.

The clamping slide 18 is positioned along frame 10 according to the length of the workpiece 14 to be bored. In the adjusted position thereof, slide 18 is movable by a fluid motor generally indicated at 40 in Figure 3 and which may be actuated by pneumatic pressure or by liquid pressure. The fluid motor comprises a cylinder 42 which is adjustable along frame 10 and which is adapted for being clamped in any adjusted position along the frame in any suitable and well known manner.

The cylinder 42 has therein a double acting piston 44 connected to the main portion of slide 18, by piston rod 46 and nut 48. Fluid from a suitable source of fluid pressure is supplied to one or the other side of the piston 44 via conduits 50 and 52 respectively. The control system, by means of which the conduits are selectively connected with a source of fluid pressure or with exhaust, is illustrated in Figure 5 and will be described subsequently.

The clamping slide 18 has a portion 54 in axial alignment with spindle 15. Passing through portion 54 of clamping slide 18 is a tubular boring tool 74 carrying at the end engaging the workpiece cutting means for boring a bore of the proper size in the workpiece. The boring tool enters portion 54 of the clamping slide via a sealing means generally indicated at 76 and between the point where the boring tool sealingly enters the clamping slide and the workpiece end of the clamping slide is a coolant inlet conduit 80. This pipe opens into the interior of portion 54 of the clamping slide to the space about the boring tool 74 and the cooling fluid, such as oil is thus supplied along the outside of the boring tool to the end thereof that is engaging the workpiece. Since the boring tool is hollow the cooling fluid returns through the hollow boring tool and is discharged to a sump or filter via telescoping exhaust conduit means 78.

The pressure of the cooling liquid is extremely high and may be as much as 25 atmospheres, in order to flush away the chips that are taken by the boring tool and to maintain the boring tool and workpiece cool under the extremely rapid cutting conditions established. It is particularly important, in view of the extremely high pressure of the coolant, to prevent leakage thereof or to prevent the workpiece from being unclamped while the cooling fluid is still being supplied under pressure. For this reason there is preferably provided sealing means between the spindle and the workpiece and also between the workpiece and the clamping slide preventing leakage of the cooling fluid from therebetween. As will be seen hereinafter, means are provided for preventing operation of the pump supplying the coolant under pressure until the workpiece is sealingly clamped against the spindle.

The feeding movement of the boring slide 20 is effected by a hydraulic motor generally indicated at 92 and which comprises an elongated cylinder 94 adapted for being locked in any desired position of adjustment on the frame of the machine by suitable clamping means. Located within cylinder 94 is a piston 96 connected by piston rod 98 and nut 100 with slide 20.

The opposite ends of the cylinder 94 are connected by means of conduits 102 and 104 with a source of fluid pressure, preferably a hydraulic medium, by means of a hydraulic control system illustrated in Figure 6 and to be described more in detail hereinafter.

Referring now to Figure 5, it will be seen that the conduits 50 and 52 pertaining to the clamping slide motor, communicate with the service ports of a valve housing 120 containing a reciprocable valve member 122. A pressure supply conduit 124 is connected with the pressure inlet port in the center of the valve housing by means of conduit 126.

The valve housing is also provided with exhaust conduit means at 128 and 130.

For controlling the operation of the reciprocable valve member in the valve housing, there is provided the manually operable pilot valves 132 and 134. Each of these valves has a valve member normally urged by a spring into position to interrupt communication between pressure conduit 126 and the pertaining pilot conduits 146 and 148 leading to the opposite ends of the valve housing. Upon shifting either of the pilot valve members, however, the conduit 126 is connected with the pertaining end of the valve housing and causes the valve member to shift to the opposite end of the valve housing. Preferably, the opposite ends of the valve housing are continuously connected with exhaust by conduits 150 which are relatively small in cross section. It will be evident that the clamping slide is readily shiftable in either direction merely by actuating one or the other of the pilot valve members. A feature of the present invention is found in the switch 172 which is normally open but which is connected by conduit 170 with the pressure supply to the control valve for the clamping slide. Should the pressure supply for the clamping slide drop below a predetermined amount switch 172 will open and thus interrupt operation of the main drive motor for the spindle and the motor for the coolant pump thereby preventing operation of the machine under conditions where the workpiece might slip in the spindle or where leakage of the high pressure coolant might occur at the ends of the workpiece.

The clamping slide 18 has secured to one side thereof a cam element 174 as will best be seen in Figure 3. This cam element is adapted for engagement with switch means at 176 and which switch means has a first contact in the energizing circuit for the main drive motor 13 and a second contact in the energizing circuit for the motor for the coolant pump. The cam member 174 and switch 176 are so arranged relatively that the switch 176 will be closed only when a workpiece of the proper length is clamped in position between the spindle 15 and the clamping slide. This positively prevents operation of the main motor and the coolant pump motor under any conditions other than when a workpiece of the proper length is clamped in place in the machine.

The switch 176 is adapted for adjustment along the frame by means of T-slot 179 extending along frame 10.

Referring now to Figure 6, the drive motor 182 drives a gear pump 184 and a piston pump 186. Hydraulic fluid is supplied to pump 184 by conduit 188. The discharge from the gear pump is delivered to the piston pump and from the piston pump pressure fluid passes through a conduit 190 in accordance with the adjustment of the control knob 192 that has a pointer 194 sweeping over a dial. This adjustment shows the amount of pressure fluid being delivered to conduit 190 and this determines the rate of feed of the boring slide.

Conduit 190 opens into cylinder chamber 196 in which is mounted a piston 198 and a piston 200. Piston 200 is biased upwardly by spring 202 bearing on abutment 204. Abutment 204 is adjustable as to its position in chamber 196. As shown, piston 198 uncovers a conduit 206 that communicates with the central portion of a chamber 208 in which is a piston 210 manually displaceable by knob 212. Piston 210 at its center has a recess 214 through which pressure fluid passes to conduit 216 that is connected with the previously mentioned conduit 102 that leads to the advancing side of the boring slide piston 96. The piston 210 is shown in Figure 6 in position for the boring slide to advance and in this position the piston cuts off communication between the center part of chamber 208 and conduit 218 leading to exhaust via check valve 220.

Leading from gear pump 184 is a conduit 222 which opens into chamber 224 in which is a piston 226 biased by spring 228 bearing against adjustable abutment 230. At a predetermined pressure, the piston 226 will yield downwardly and uncover a conduit 232 to a predetermined degree. This pressure, determined by the position of abutment 230, may amount to from 25 to 30 atmospheres. Conduit 232 communicates through conduit 234 with the space in chamber 196 between pistons 198 and 200 and also through conduit 236 with the conduit 104 leading to the retracting side of boring slide piston 96.

The pressure in conduit 104 is determined by piston 200 which is biased by spring 202 and which piston will yield downwardly to provide communication with conduit 238 leading to exhaust. Piston 198 which is actuated by a supply of pressure fluid from pump 186 moves piston 200 downwardly when the pressure reaches a predetermined amount whereby the piston 200 is caused to open the outlet through the conduit to exhaust. The pressure in conduit 104, which is a back pressure holding the boring slide stable, then drops to a small value.

During the feeding of the boring slide 20 if the boring tool meets a soft spot or a hole in the workpiece, the supply of pressure actuating the boring slide motor will drop and this will permit piston 198 to move upwardly whereupon piston 200 will restrict conduit 238 and the back pressure on piston 96 will be augmented whereby the boring slide is prevented from jumping ahead. Similarly, if the boring tool meets a hard spot, the pressure on top of piston 198 will rise and move piston 200 downwardly thereby reducing the back pressure on the boring piston and increasing the forward thrust on the boring slide.

Chamber 224 communicates through a port 240 with a chamber 242 containing a reversing valve piston 244 which has a reduced diameter portion 246 exposed through the internal passage 248 to the pressure standing in chamber 224. Valve piston 244 is under the influence of spring 250 urging the valve downwardly as viewed in Figure 6. There is a second reduced diameter portion 252 in the valve and therefrom there extends a conduit 254 communicating with the exhaust and a conduit 256 extending to the outside end of piston 210.

The portion of chamber 242 above valve 244 is constantly connected with conduit 206 by conduit 258. Should the pressure on the boring tool rise, for example, by the tool becoming dulled, the pressure in the supply system increases and acts through conduit 258 to move valve 244 downwardly thereby interrupting communication between conduit 254 and 256 and instead connecting channel 248 with conduit 256. This delivers pressure to the outside of piston 210 whereby the piston is moved inwardly and the conduit 102 is immediately relieved of pressure through conduit 216 and the uncovered outlet conduit 218. The machine thus automatically reverses upon the boring slide reaching a predetermined resistance. This resistance may occur during a boring operation as upon meeting a hard spot in the workpiece or the boring tool becoming dull or broken, or it may occur at the completion of the boring operation when the boring slide comes to a halt against a fixed abutment provided for the specific purpose of stopping the boring slide and causing reversing thereof.

For obtaining rapid advance of the boring tool to working position, there is a valve 260 shown in Figure 4 and which has a piston 262 mounted on an arm 264 which is supported at 266. One end of the arm carries a roller 268 adapted for engagement by cam 270 carried by the boring slide. A spring 273 normally urges piston 262 to a position to connect conduits 272 and 274, the latter leading to the central portion of chamber 208 and the conduit 272 communicating with conduit 104.

When the boring slide advances under these conditions by a supply of fluid to the conduit 102, this conduit will be supplied with fluid from both of the pumps 184 and 186 and, since the retraction side of piston 96 is also connected to this pressure, the boring slide will advance at a rate of speed determined by the area of the piston rod. At this time, due to the low pressure in the system, conduit 104 is closed off from exhaust. When the boring bar approaches the position where it will engage the work, the cam 270 will actuate valve 260 and the boring slide will go on feed movement and advance into the work at reduced speed. At this time, the fluid from conduit 104 commences to pass to exhaust and the system pressure rises.

Referring to the wiring diagram of Figure 7, the power supply lines are indicated at L1 and L2, and therebetween is connected the motor 182 for the hydraulic pumps by means of a switch 300 and a second switch 302. Switch 302 is the main switch and serves to connect a wire 303 with power line L1 when closed. Wire 303 has in series therewith switch 172 which is closed when the clamping fluid pressure is at the proper amount or above. Wire 303 has one branch leading through a normally open switch 283 and one blade of the normally open switch 176 to the coil of relay R1. Relay R1 is adapted for being energized when the said switches are closed and the energization of which relay is maintained through a holding circuit containing the normally closed switch 290 that is adapted for being opened when the boring slide has substantially completed its retracting movement. Relay R1, when energized, energizes the motor 304 pertaining to the cooling fluid pump.

Wire 303 has another branch leading through a normally open switch 280 and a second blade of normally opened switch 176 to the coil of a second relay R2 so that the closing of the two switches will energize the said coil. This energization is maintained through a holding circuit containing a switch 286 that is normally closed but which is adapted for being opened immediately after the boring tool breaks through the workpiece at the end of its advancing stroke. Relay R2 is adapted when energized to effect energization of the main drive motor 13.

Reference to Figure 4 taken together with Figure 3 will show the manner in which the switches referred to above are operated. In Figure 3, it will be noted, as previously described, that the two portions of the switch 176 are closed only when the clamping slide is in proper clamping position against a workpiece of the proper length.

Switches 282 and 280 are arranged for sequential operation in the order named by actuating arm 278 engageable by pawl 276 carried by the boring slide and which pawl cooperates with the arm first to close switch 282 and thereafter switch 280 and the said pawl is also pivotally supported so as to pass idly by arm 278 on the return stroke of the boring slide.

When the boring slide has completed its advancing movement, a pawl 288 carried thereby engages and opens switch 286 thus de-energizing the spindle motor 13. As explained before, at the end of the advancing movement of the boring slide, it strikes an abutment causing a pressure rise on the advancing side of the piston 96 which causes automatic reversing of the boring slide. As the boring slide retracts and just before the boring tool leaves the workpiece, pawl 284, effective only in the retracting direction of the boring slide, engages and opens switch 290 thus de-energizing coolant pump motor 304.

It will be evident that an entire automatic cycle is provided for having interlocks that provide for halting of the cycle upon failure of any of the principal functions of the machine. The energization of relays R1 and R2 is under the control of the position of the boring slide and the position of the clamping slide and also the pressure of the fluid delivered to the clamping motor. All operative conditions must thus be proper before the machine will operate and must remain proper for the work cycle to continue.

It will be understood that this invention is susceptible to modification in order to adapt it to different usages and conditions; and, accordingly, it is desired to comprehend such modifications within this invention as may fall within the scope of the appended claims.

I claim:

1. In a boring machine; a frame, a spindle at one end of the frame having a drive motor, a clamp slide adjustable along the frame having a movable portion for clamping a workpiece against the spindle, a boring tool extending sealingly through the clamp slide to engage the end of the workpiece, a boring slide supporting said boring tool and movable on the frame to advance the tool into the work, means for supplying coolant under high pressure through said clamp slide to the outside of said boring tool, a coolant pump motor, energizing circuits for said spindle motor and said coolant pump motor, means responsive to advancing movement of said boring slide for first completing the circuit to the coolant pump motor and then to the spindle drive motor before the boring tool engages the work, and means for preventing energization of said motors except when the movable portion of the clamp slide is in a predetermined position along the frame, said last mentioned means comprising normally open switches in the energizing circuits for said motors adjustable along the frame and a cam carried by the said movable portion operable to engage and close the said switches.

2. In a boring machine; a frame, a spindle at one end of the frame having a drive motor, a clamp slide adjustable along the frame having a movable portion for clamping a workpiece against the spindle, a boring tool extending sealingly through the clamp slide to engage the end of the workpiece, a boring slide supporting said boring tool and movable on the frame to advance the tool into the work, means for supplying coolant under high pressure through said clamp slide to the outside of said boring tool, a coolant pump motor, energizing circuits for said spindle motor and said coolant pump motor, means responsive to advancing movement of said boring slide for first completing the circuit to the coolant pump motor and then to the spindle drive motor before the boring tool engages the work, and means for preventing energization of said motors except when the movable portion of the clamp slide is in a predetermined position along the frame, said last mentioned means comprising normally open switches in the energizing circuits for said motors adjustable along the frame and a cam carried by the said movable portion operable to engage and close the said switches, there being means operable by the boring slide when the boring tool breaks through the spindle end of the workpiece for de-energizing the spindle motor, and means operable by the boring slide when the boring tool has been retracted to the region of the clamp slide end of the workpiece for de-energizing the said coolant pump.

3. A boring machine according to claim 2 in which the clamp slide is fluid operable, a source of fluid under pressure for actuating the clamp slide, and a normally open switch means in the said energizing circuits for said motors adapted for being closed in response to a predetermined minimum pressure of said source of fluid.

References Cited in the file of this patent

UNITED STATES PATENTS

| | | |
|---|---|---|
| 1,979,478 | Leland | Nov. 6, 1934 |
| 2,064,427 | Gurney et al. | Dec. 15, 1936 |
| 2,146,446 | Schmidt | Feb. 7, 1939 |
| 2,285,069 | Vickers | June 2, 1942 |
| 2,286,079 | Egger et al. | June 9, 1942 |
| 2,558,275 | Siekmann et al. | June 26, 1951 |
| 2,559,369 | Phillips | July 3, 1951 |
| 2,675,514 | Smith | Apr. 13, 1954 |
| 2,741,936 | Wohlfahrt | Apr. 17, 1956 |